United States Patent [19]
Shulman

[11] 4,428,997
[45] Jan. 31, 1984

[54] PROTECTIVE COATINGS FOR DOCUMENTS

[75] Inventor: Joseph Shulman, Hyde Park, Mass.

[73] Assignee: Polaroid Corporation, Cambridge, Mass.

[21] Appl. No.: 107,415

[22] Filed: Dec. 26, 1979

[51] Int. Cl.³ .................. B32B 3/18; B32B 27/28; B41M 3/14
[52] U.S. Cl. ..................... 428/202; 283/75; 350/163; 350/165; 427/7; 427/385.5; 428/40; 428/204; 428/336; 428/480; 428/483; 428/913; 428/915; 428/916
[58] Field of Search ............... 428/332, 915, 40, 916, 428/483, 336, 480, 202, 204; 427/7, 385.5; 283/7, 8 R; 350/163, 165

[56] References Cited
U.S. PATENT DOCUMENTS

| | | | |
|---|---|---|---|
| 3,245,697 | 4/1966 | Nugent | 283/7 |
| 3,481,663 | 12/1969 | Greenstein | 350/163 |
| 3,801,183 | 4/1974 | Sevelia et al. | 350/165 X |
| 3,827,726 | 8/1974 | McVoy et al. | 283/7 |
| 4,010,293 | 3/1977 | Davis | 427/261 X |
| 4,151,666 | 5/1979 | Raphael et al. | 283/7 X |
| 4,151,667 | 5/1979 | Idelson et al. | 283/7 X |

OTHER PUBLICATIONS

L. M. Greenstein, "Nacreous Pigments", from Encyclopedia of Polymer Science & Tech., vol. 10, 1969, pp. 193–211.

*Primary Examiner*—Thomas J. Herbert, Jr.
*Attorney, Agent, or Firm*—Louis G. Xiarhos

[57] ABSTRACT

Protective coatings for securing documents from alteration comprising a noncohesive adhesive layer integrated with a verification feature and a method for applying such coatings.

4 Claims, 6 Drawing Figures

PROTECTIVE COATINGS FOR DOCUMENTS

Alteration of information-bearing documents is a problem that is continually encountered by those engaged in the handling of such documents for personal or business transactions. Without some positive means of assurance that a subject document is genuine and has not been tampered with, one is forced to operate at the mercy of those who may attempt to pass altered documents.

Recent years have seen the development of various protective systems designed in particular for identification documents, such as credit cards, passports, driver licenses, ID cards and the like. In order to maintain the integrity of such documents, various protective sheet materials have been proposed for application to their information-bearing surfaces. These protective sheets must feature at least substantial transparency so that the substrate, the information-bearing document, remains readily visible. In addition, it is generally desirable that the protective sheets render the document rigid or semi-rigid in order to be sufficiently durable to withstand everyday usage. Typical materials employed have been plastic sheet materials such as cellulose acetate butyrate, polyvinyl chloride, polyethylene, polyester, and the like.

To discourage attempts to remove a protective plastic sheet from the underlying document substrate, an adhesive means must be employed, between the sheet and the document, which features enough bonding efficiency to ensure a security seal. Specifically, the protective plastic sheet must be bonded in such a manner that attempts at removal of the sheet will cause removal of all or substantial portions of the information-bearing surface of the substrate. In such a fashion, the document that has been tampered with is destroyed or obliterated to a degree that it would be obvious to anyone inspecting it. Various adhesives are commonly employed, depending on the specific nature of the sheet and substrate involved.

As a further positive means of discouraging document falsification, several verification features have been suggested for incorporation into protective sheet systems. These verification features include such devices as watermarks, fluorescent markings, polarizing stripes, and other validation means. To be most effective, these verification features must be capable of being superimposed over a document while maintaining substantial invisibility under normal viewing conditions. To validate a document, the mark then should be capable of detection and reading under modified viewing conditions which render the marking visible.

Many of these security devices briefly described above have achieved some degree of success in thwarting those individuals bent on tampering with documents so protected. Removing, reusing, duplicating and/or altering many of these security devices apparently presents a formidable enough obstacle to discourage most potential counterfeiters. However, successful utility of any of these security devices requires strict control of the complete document system and generally is restricted to a particular system. Specifically, protective sheets, documents substrates, adhesives and verification features must be coordinated for compatibility. Much difficulty is encountered, for example, in adapting a particularly designed protective system to a different document substrate. Accordingly, each of the existing devices falls short of ideal characteristics for universal application to various document substrates. As mentioned initially above, the discussed protective systems have been developed notably for such documents as ID cards. Control of all of the elements of an ID card system is known to be essential.

The present invention is directed to protective coatings which can be used as a security overlay for various documents, such as titles, deeds, birth certificates and the like. These documents are typified in being of nonuniform characteristics, varying in paper substrate quality, texture and composition from locality to locality. Little success has been achieved in adapting any of the known ID card-type systems to such universal document use. A primary problem encountered is in establishing effective compatible adhesion between a protective sheet and varying document substrates. Failure of such a critical facet of a protective system completely negates the required degree of assurance and integrity sought to be established for the document.

Now, according to the present invention, it has been discovered that security-protected documents can be effectively prepared using a novel protective coating comprising a select adhesive layer integrated with a verification feature.

In the present invented system, there is no need for security-sealed protective plastic sheets common to ID card systems. Accordingly, the present invention overcomes the problem encountered in formulating a system which is effective in establishing a security seal between a plastic protective sheet and a variety of document substrates. Instead, the present invention comprises a coating comprising a noncohesive adhesive material which readily forms a secure bond to a wide variety of document substrates. In order to prevent successful removal of this coating, the adhesive coating exhibits low enough cohesive strength that it cannot be removed intact from the underlying document. Preferably, to further discourage tampering efforts, the coating also is applied in such a thin manner so as to offer a surface nearly impossible to grasp in an attempt to peel it away.

The coating adhesive can be any suitable pressure-activatable adhesive, moisture-activatable adhesive or heat-activatable adhesive employed in the art for application of security laminae. So that the underlying document information is not obscured, the adhesive should be transparent and nonyellowing. Preferred are heat-activatable adhesives that have a low softening point and a low melt viscosity and sufficiently poor cohesive film strength so that the resulting coating cannot be peeled away intact once it has been applied to a document. For handling purposes, the adhesive also should be nonblocking; once applied to a document, the exposed surface of the protective coating should not have a tendency to adhere to another surface, such as an overlying document. Suitable heat-activatable adhesives that are commercially available include those listed below in Table A:

TABLE A

| TRADEMARK DESIGNATION | CHEMICAL STRUCTURE | COMMERCIALLY AVAILABLE FROM |
| --- | --- | --- |
| TS-100 | STYRENE-ACRYLATE | MONSANTO CHEMICAL CO. |
| ELVACE 1895 | POLYVINYL ACETATE | E.I. duPont deNemours & Co., Inc. |
| DARATAK 79-L | POLYVINYL ACETATE COPOLYMER | W. R. GRACE CO. |
| EVERFLEX GT | POLYVINYL ACETATE COPOLYMER | W. R. GRACE CO. |
| DESMOCOLL E-471 | POLYURETHANE | MONSANTO CHEMICAL CO. |
| DARATAK B | POLYVINYL ACETATE COPOLYMER | W. R. GRACE CO. |
| ADCOTE 50C-35 | POLYETHYLENE-ACRYLIC ACID | MORTON CHEMICAL CO. |
| AIRFLEX A-401 | ETHYLENE VINYL ACETATE | AIRCO CHEMICAL CO. |
| AIRFLEX A-402 | ETHYLENE VINYL ACETATE | AIRCO CHEMICAL CO. |
| DARATAK 52-L | LOW MOLECULAR WT. POLYVINYL ACETATE | W. R. GRACE CO. |
| DARATAK 74L | POLYVINYL ACETATE | W. R. GRACE CO. |

Particularly preferred as the adhesive layer is a polyethylene-acrylic acid resin, commercially available from Morton Chemical Co., as a dispersion in an ammonia or amine water vehicle, under the trademark "ADCOTE 50C-35."

As a positive means of assurance, the protective coating of the present invention includes a verification feature. This verification feature may be any of the devices known in the art. As discussed above, such devices include watermarks, fluorescent markings, polarizing stripes, and other verification devices. Further details relating to the use of such devices can be found in such patents as U.S. Pat. Nos. 4,151,666; 3,961,956; 3,827,726; 3,675,948; 3,414,998; 3,332,775; 3,279,826 and 2,984,030.

The preferred verification means is the use of a nacreous pigment material. Nacreous materials are self-verifying; no supplemental equipment is required for verification checks. These materials or pigments are products well known in the art. Further details regarding such pigments can be found, for example, in *Nacreous Pigments*, L. M. Greenstein, Encyclopedia of Polymer Science and Technology, Vol. 10 (1969) p. 193–211, and in U.S. Pat. Nos. 3,331,699; 3,138,475; 3,123,490; 3,123,489; 3,071,482; 3,008,844; 2,713,004 and commonly assigned copending U.S. application Ser. No. 744,995, filed Nov. 26, 1976 by J. Shulman and T. Raphael now abandoned and refiled as continuation application Ser. No. 191,635, filed Sept. 26, 1980.

For the purposes of the present invention, a suitable nacreous material or pigment is one which is selectively transparent and exhibits different light-reflecting characteristics when viewed from different angles. These perceptible differences in light-reflecting characteristics can involve, for example, a change in color or opacity when the angle of viewing the pigmented surface is changed. Preferred nacreous pigments are bismuth oxychloride, lead subcarbonate and $TiO_2$-coated mica.

To serve as a means of verification, the nacreous pigment material may be integrated with the protective coating of the present invention in numerous manners and may appear in a wide variety of arrangements. The nacreous pigment may be applied to form any random or ordered arrangement; but, in order to deter unauthorized duplication of the nacreous arrangement, it is most preferable to apply the nacreous pigment in the form of an ordered arrangement of nacreous-treated and untreated areas. For example, such an ordered arrangement may appear as an alphabetical, numerical, floral or fanciful pattern. An official design or logo, or a name or phrase, readily could be used. An added degree of security can be accomplished by applying the nacreous pigment in an ordered arrangement having a tightly-printed pattern, i.e., having a plurality of finely-divided nacreous-treated and untreated areas in close proximity to one another. A tightly-printed pattern may, for example, appear as an often repeated logo, design or phrase. To accomplish an added degree of security through the use of a tightly-printed pattern, the protective coating should be positioned over a vital information-bearing portion of the underlying document and the nacreous material should be arranged in a pattern exhibiting a density of nacreous-treated to untreated areas higher than the density of print on the underlying portion of the document. In this fashion, a significant segment of each element of the information on the protected portion of the document will be overlapped by nacreous material. Accordingly, it would be impossible to alter the underlying document information by a strikeover, such as a markover or typeover, without also marking-over some portion of the nacreous arrangement.

A carefully executed strikeover type alteration normally is difficult to detect. However, by utilizing this embodiment of the protective coating of the present invention, such as alteration is readily observed. The nacreous material used in the present invention is selectively transparent; observed at a normal viewing angle the nacreous pigment is transparent, but, when viewed at a different viewing angle, the pigment assumes its light-reflecting mode. In detection of an attempted strikeover alteration, the document bearing the nacreous pigment pattern merely is positioned at such an angle so as to view the nacreous material in its reflective mode. Since the nacreous material is situated in a coating between the alteration and the document, in its reflective mode, the nacreous pattern serves to obscure all information beneath it on the underlying document; but, at the same time, the strikeover, which is above the pattern, stands out against the reflective background for ready detection.

Developing this manner of security against strikeovers one step further, a solid, continuous arrangement of nacreous pigment material, of course, would offer the best reflective background. Also, since the nacreous material would fully cover each element of the information on the protected portion of the document, any strikeover necessarily would be made over a pigment-covered area and the nacreous pigment in its reflective mode would readily reveal the alteration attempt. Nevertheless, a tightly-printed pattern is preferred, primarily because of the security advantage it offers in regard to the difficulty of unauthorized duplication of the pattern.

The nacreous material can readily be integrated with the protective adhesive coating by applying the nacreous pigment to the surface of the adhesive. This can be accomplished, preferably, by dispersing the nacreous material in a suitable medium and applying the dispersion to the surface of the adhesive layer by known printing methods such as silk screening or gravure printing techniques. Alternatively, nacreous pigment may also be incorporated simply by dispersing the pigment material within the adhesive composition.

The preferred dispersions for providing the printed patterns are those comprising a nacreous material dispersed in a medium which, on drying, can provide a matrix or binder for the printed pattern capable of effectively holding the pattern to the adhesive layer. The matrix or binder providing material can comprise, for example, the same adhesive as is used in the adhesive layer, or it can be a different but compatible adhesive. Dispersions having a pigment to binder ratio ranging from about 0.5:1 to about 3.0:1 have been found to be preferable.

The thickness of the printed pattern generally can vary; but, preferably, the thickness ranges from about 0.1 to about 0.4 mil. Coatings within this range produce desirable transparency and reflection efficiency; lighter coatings of pigment reduce reflection and diminish viewability of the nacreous pigment arrangement, whereas heavier coatings tend to adversely affect selective transparency and reduce viewability of the underlying document information. Typical commercially available nacreous pigment materials suitable for use in the present invention are listed in Table B below:

TABLE B

| NACREOUS PIGMENT[1] | TRANSMISSION COLOR | REFLECTION COLOR |
|---|---|---|
| BIJU BWD | Colorless | Silver |
| Nacromer ZNC-B | Colorless | Silver |
| Flamenco Blue #100 | Yellow | Blue |
| Duochrome Iridescent GY | Green/Gold | Gold |
| Duochrome Iridescent BY | Blue | Gold |
| Duochrome Iridescent RG | Reddish/Blue | Green |
| Duochrome Iridescent BG | Blue | Green |
| Duochrome Iridescent BR | Blue | Red |
| Duochrome Iridescent YG | Gold | Green |
| Flamenco Green #100 | Red | Green |
| Supersilk | Pearl Effect | Pearl Effect |
| MURANO MGNS | Red | Green |
| MURANO MYNS | Blue | Gold |
| MURANO MBNS | Yellow | Blue |
| MURANO MYVT | Blue | Gold |
| MURANO MRVT | Green | Red |

[1]The listed nacreous pigments are commercially available from the Mearl Corporation.

When the nacreous material is applied in a solid continuous arrangement or in a tightly printed pattern, the amount of pigment employed adversely affects the adhesive strength of the binder in which it is dispersed. Rather than rely on the nacreous pigment layer for security bonding to the document substrate, the protective coating of the present invention preferably provides for an adhesive sandwich arrangement in which a second layer of noncohesive adhesive is coated on top of the nacreous pattern. This adhesive then serves as the surface for application to the information-bearing document substrate.

As mentioned above, the protective coating should be applied in a manner to produce a coating thin enough to offer minimal substance, i.e., thin enough to be incapable of being grasped either by hand or instrument. To accomplish such a surface, generally, adhesive layers having a thickness in the range from about 0.10 to about 0.75 mil have been found acceptable. A layer thickness ranging from about 0.15 to about 0.35 mil is most preferable.

Because of its thinness and low cohesive strength, however, the protective coating, according to the present invention, lacks the integrity to be readily handled and applied. To accommodate application, a preferred embodiment of the invention comprises an assembly including a carrier sheet peelably bonded to the protective coating of adhesive material integrated with a verification feature. Using this assembly, the protective overlay is positioned over the desired information-bearing surface of a document; the adhesive, which must be preferentially adhesive to the document substrate, then is securely bonded to the document and the peelable sheet is removed. Most preferably, the adhesive is of a heat-activatable nature and the assembly is bonded to a document using a heat lamination device. If transparent, the peelable carrier sheet may be left in place superimposed over the protective adhesive coating, and in this manner provides an added degree of abrasion resistance.

The carrier sheet used in the assembly may be any sheet material which offers a surface with sufficient adhesion to support the protective coating, but with low enough adhesion to be able to release the adhesive layer intact to the document substrate to which the coating is applied. Suitable carrier sheets include paper sheets, e.g., Kraft paper or other papers, that have been treated with release coats such as silicone, or have release films attached thereto, such as a starch, polyvinyl alcohol or polyethylene film. Polyester film has been found to provide good results and is the preferred carrier sheet.

In an alternative means of application, the verification pigment, such as the preferred nacreous pigment, may be dispersed in a suitable adhesive and then applied to a document surface by common spraying, dipping or painting techniques. Such a manner of application is, however, not preferred since an ordered verification arrangement cannot be so accomplished.

BRIEF DESCRIPTION OF THE DRAWINGS

The invention may be further understood by reference to the figures in which,

Referring to FIG. 1, document 10 consists of a paper substrate upon which information 14 has been printed, typed or otherwise imparted. The typical document drawn in FIG. 1 represents a standard title document for an automotive vehicle. In order to secure vital portions of the information-bearing document from alternation, a protective coating 12, according to a preferred embodiment of the invention, is applied over the vital information area of the document. When viewed at a normal viewing angle, as in FIG. 1, the protective coating containing nacreous pigment material is substantially transparent and one can readily view the protected information-bearing portion of the document. However, in order to verify that the protected document information has not been tampered with, one merely tilts the document to view it at a different angle, and, as shown in FIG. 2, the nacreous pigment contained within the protective coating exhibits light-reflecting characteristics. In its reflecting mode, the protective coating can be observed for evidence of tearing or removal attempts, and further, serves as a background against which any attempts at a strikeover alteration over the protective coating readily stands out. When viewed in its light-reflecting mode, the protective coating substantially obscures the secured information-bearing surface of the document substrate and a figure 18 typed over the coating becomes evident against the light-reflecting background.

FIG. 3 illustrates an alternate embodiment of the invention wherein nacreous pigment is used in the form of an often repeated pattern 16 rather than the uninterrupted, solid arrangement as in FIG. 2. In the same manner as described above regarding FIG. 2, in its reflecting mode, evidence of any removal attempts of coating 12 becomes apparent and a typed or printed figure 20 over the coating stands out for ready detection.

The cross-sectional views of FIGS. 4 and 5 illustrate the arrangement of the elements of a security coated document, according to a preferred embodiment of the invention, shown in FIG. 3. In FIG. 4 a select information-bearing portion of document substrate 10 is shown secured by protective coating 12 consisting of noncohesive adhesive layer 22 onto which has been printed a pattern 24 of a nacreous material dispersed in a binder. FIG. 5 shows an adhesive sandwich arrangement preferably employed when using pigment in a solid arrangement of a tightly-printed pattern, such as an often repeated logo or phrase. In this embodiment, protective coating 12 consists of a sandwich arrangement of adhesive layers 22 and 30 between which the nacreous pigment dispersion 24 has been applied.

Figure 1:
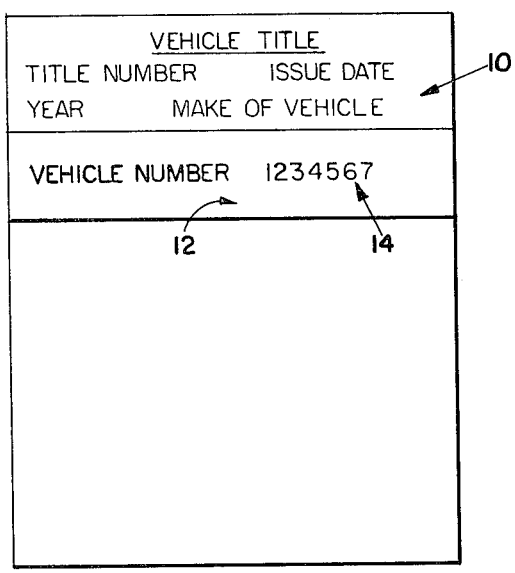
FIG. 1 is a front view of a document to which a protective coating, according to a preferred embodiment of a invention, has been applied.
Figure 2:
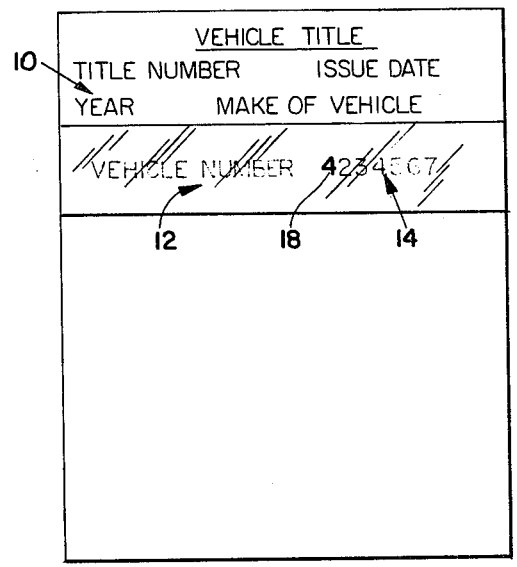
FIG. 2 is a front view of the document of FIG. 1 depicting the protective coating containing a solid nacreous pigment arrangement in its reflecting mode.
Figure 3:
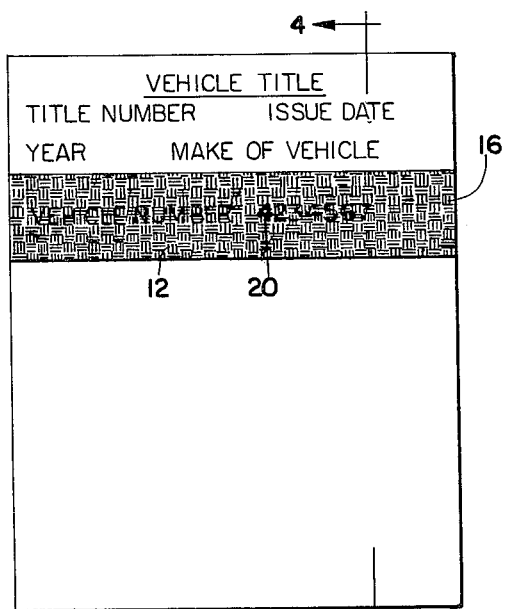
FIG. 3 is a front view of the document of FIG. 1 depicting the protective coating, including a tightly-printed nacreous verification pattern, in its reflecting mode.
Figures 4, 5:
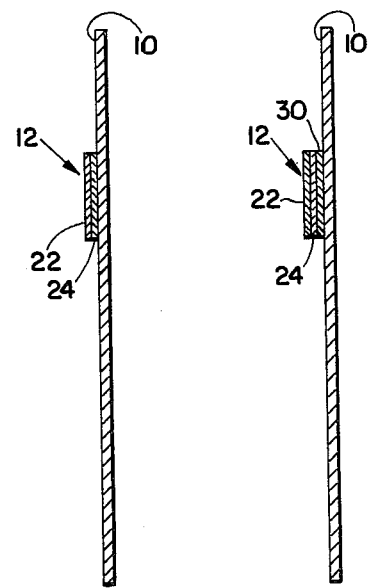
FIGS. 4 and 5 are magnified cross sectional views of the coated document of FIG. 3 viewed along lines 4—4.
Figure 6:
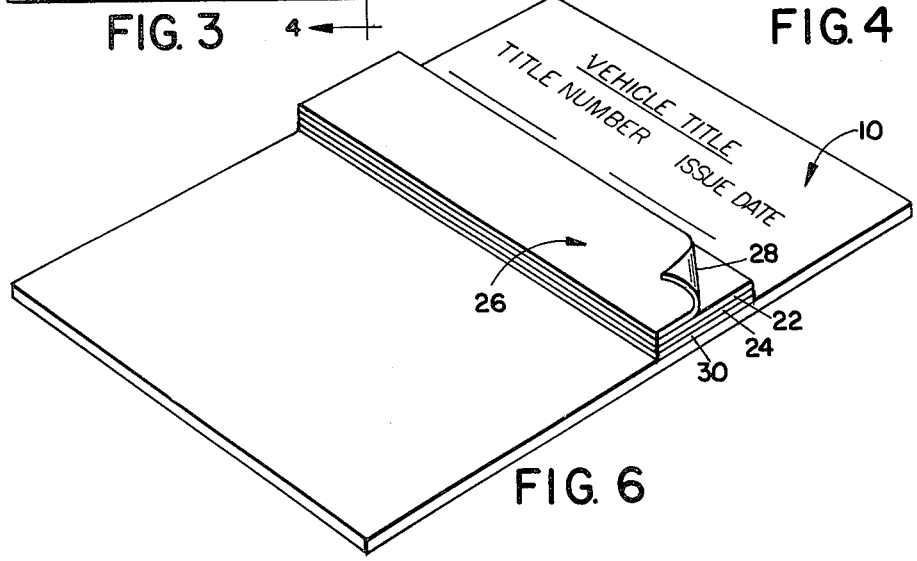
FIG. 6 is a magnified perspective view of a document to which a protective coating is being applied.

According to a preferred method, a protective coating can readily be applied to an information-bearing document, as shown in FIG. 6, by applying a carrier sheet-supported protective coating to document substrate 10 and then peeling the removable carrier sheet 26 away from adhesive coating 22. Adhesive coating 22 adheres to surface 28 of carrier sheet 26 sufficiently so as to allow the carrier sheet to serve as a support. However, the protective coating, including the nacreous pigment pattern 24 preferentially adheres to the document substrate 10 and allows sheet 26 to be easily removed.

The following examples are provided to further illustrate the invention:

EXAMPLE I

Preparation of a security coating assembly including a carrier sheet:

A ten inch wide 0.75 mil unsubbed (raw) polyester film (commercially available from Imperial Chemical Industries) was coated with a 30% solids solution of polyethylene-acrylic acid 80:20 copolymer (commercially available under the trademark ADCOTE 50C-35 from Morton Chemical Co. as a 35% solution, this was diluted with water to 30% to reduce viscosity for optimum application). A 60 line gravure roll was used to apply the ADCOTE; the application roll consists of a 60 lines per inch screen, lines are 45° to cylinder and the cells which carry the adhesive are five thousandths inch deep and the cell wall is two times the width of the well.

The polyester sheet was passed through the gravure roll and a rubber backing roll; the pressure of the rubber roll created a suction pulling the fluid from the steel gravure roll onto the polyester sheet. The sheet was then dried by passing through a gas fired oven. A dry adhesive coating thickness of about 0.30 mil was achieved.

The adhesive (ADCOTE) coated film was then printed with a nacreous pattern using the following composition:

| INGREDIENTS | PARTS BY WEIGHT |
| --- | --- |
| ADCOTE 50C-35 (35% solids) | 285.7 |
| FLAMENCO GOLD #100[(1)] | 200.0 |
| WATER | 200.0 |
| Solids 43.75% | |
| Pigment to binder 2/1 | |
| Viscosity - Brookfield - No. 2 Spindle | |
| 50 RPM - 600 cps. | |

[(1)]Flamenco Gold #100 is a commercially available nacreous pigment comprising titanium dioxide coated on mica. Flamenco Gold #100 is sold by the Mearl Corporation and has the following characteristics:

| Reflection Color | Gold |
| --- | --- |
| Transmission Color | Blue |
| Bulk Density (lbs/ft$^3$) | 12 |
| Particle Size Range (microns) | 10–35 |
| Average Particle Size (microns) | 20 |
| Specific Gravity | 3.0 |

The nacreous composition was applied with a 175 line gravure roll consisting of a Pennsylvania state seal pattern. The nacreous pattern had a thickness of about 0.20 mil.

EXAMPLE II

Following the procedure of Example I, a security coating assembly was prepared. In this example, however, the nacreous pattern was printed from a composition having a 1:1 pigment to binder ratio.

EXAMPLE III

Once again a security coating assembly was prepared using the same general procedure as outlined above in Example I. In this example, however, a 1.0 mil polyester film was employed as the carrier sheet for the protective coating.

EXAMPLE IV

Protective coating application and testing:

Each of the security coatings of Examples I—III as applied to a typed information-bearing document with heat and pressure using a processing method consisting of heated laminating rolls, at a temperature of about 210° F. It is desirable to laminate at high speeds because of economics; we found that 9"×4" documents could be processed in 2-3 seconds. The document substrate employed was a common base stock 60 lb. per 300 ft. ream with a resin coating to provide a smooth surface for printing.

The (polyester) carrier was removed from the document by hand. However, removal could readily assume a continuous operation as in a "roller" or pickup device in the laminating machine.

Acceptable security was determined by attempting to remove the coating by conventional methods including a sharp instrument, SCOTCH tape, and washing with water and solvent. In all cases where the coating was attempted to be stripped from the document a "fiber tear" resulted with destruction to the typed information.

EXAMPLE V

Preparation and testing of a protective coating containing a continuous nacreous pattern:

A security coating assembly was prepared having the following sandwich arrangement of a solid nacreous pigment layer between two noncohesive adhesive layers. One of the adhesive layers was coated onto a polyester film which served as a carrier sheet for the assembly.

| Assembly Arrangement: | |
|---|---|
| Film carrier base: polyester | 0.75 mil |
| Adcote-50C-35 (ethylene acrylic acid) | 0.2 mil |
| Biju BWD (bismuth oxychloride) | 0.2 mil |
| Adcote-50C-35 | 0.2 mil |

The individual layers were applied using a No. 8 rod for the Adcote layers and a No. 4 rod for the BWD; solids and viscosities were adjusted to provide the desired thickness. The layers were dried at 90° C./3 mins—slit to the appropriate size and laminated over documents consisting of typed information on American Banknote, Hammermil Sentry and Mass. Registry papers. The polyester was then stripped from the coating. Alterations in the protected information were made by typing, use of marking instruments, such as a solvent based felt tip (e.g. Sharpie) or ball point. All of these alterations were readily observed by correct angle viewing of the document whereby the reflective nacreous undercoat provided a background against which the alteration figures were conspicuous.

EXAMPLE VI

Using the same general procedure of Example V, a protective coating was prepared and tested. In this example, however, the nacreous pigment material used was a lead subcarbonate pigment commercially available from the Mearl Corp. under the trademark Nacromer ZNC-B in a nitrocellulose binder—35% pigment solids and 10% nitrocellulose binder.

The assembly arrangement was as follows:

| Film carrier base: 0.75 mil polyester | | |
|---|---|---|
| Coatings: | Adcote - 50C-35 (ethylene acrylic acid) | 0.2 mil |
| | Nacromer ZNC-B | 0.2 mil |
| | Adcote - 50C-35 | 0.2 mil |

Once bonded to standard document materials, the protective coating successfully resisted removal attempts and provided a good selectively reflective nacreous background against which alteration attempts were readily viewed.

While the invention has been particularly shown and described with reference to preferred embodiments thereof, it will be understood by those skilled in the art that various modifications in form and detail may be made therein without departing from the spirit and scope of the invention. For example, the verification feature, such as the nacreous pigment, may be integrated with the protective coating in various manners and arrangements and may be fashioned into a variety of logos or designs. The protected document may be any document or paper including titles, passes, tickets, birth certificates, deeds and the like.

What is claimed is:

1. A protective coating assembly for an information bearing document comprising a polyester carrier sheet peelably bonded to an arrangement of two noncohesive layers of a polyethylene-acrylic acid resin adhesive sandwiching an arrangement of a tightly printed pattern of a nacreous pigment composition.

2. The protective coating assembly of claim 1 wherein said nacreous pigment composition comprises a bismuth oxychloride composition having a thickness ranging from about 0.1 to about 0.4 mil.

3. A method for securing a document comprising:
   positioning an adhesive surface of a protective coating assembly over an information-bearing surface of a document, said protective coating assembly comprising a polyester carrier sheet peelably bonded to an arrangement of two noncohesive layers of polyethylene-acrylic acid resin adhesive sandwiching an arrangement of a tightly printed pattern of a nacreous pigment composition;
   securely bonding said adhesive surface to the document by heat lamination to form a security-protective coating; and
   removing the peelably bonded carrier sheet from the adhesive arrangement.

4. The method of claim 3 wherein said adhesive surface is securely bonded to the document using laminating rollers at a temperature of about 210° F.

* * * * *